(12) United States Patent  
Grobe et al.

(10) Patent No.: US 9,294,215 B2  
(45) Date of Patent: Mar. 22, 2016

(54) METHOD OF OPERATING AN OPTICAL NETWORK ELEMENT AND OPTICAL NETWORK ELEMENT

(75) Inventors: Klaus Grobe, Planegg (DE); Markus Roppelt, Karlsruhe (DE)

(73) Assignee: ADVA Optical Networking SE (DE)

( * ) Notice: Subject to any disclaimer, the term of this patent is extended or adjusted under 35 U.S.C. 154(b) by 55 days.

(21) Appl. No.: 13/401,497

(22) Filed: Feb. 21, 2012

(65) Prior Publication Data

US 2012/0251122 A1     Oct. 4, 2012

(30) Foreign Application Priority Data

Mar. 29, 2011   (EP) ..................................... 11160106

(51) Int. Cl.  
*H04J 14/02* (2006.01)

(52) U.S. Cl.  
CPC ......... *H04J 14/0221* (2013.01); *H04J 14/0254* (2013.01); *H04J 14/0275* (2013.01); *H04J 14/0282* (2013.01); *H04J 14/02* (2013.01); *H04J 14/0265* (2013.01)

(58) Field of Classification Search  
CPC ... H04J 14/02; H04J 14/0221; H04J 14/0254; H04J 14/0265; H04J 14/0275  
See application file for complete search history.

(56) References Cited

U.S. PATENT DOCUMENTS

| | | | |
|---|---|---|---|
| 6,687,269 B1 * | 2/2004 | Rice et al. ................. | 372/29.022 |
| 7,067,795 B1 * | 6/2006 | Yan ....................... | G02F 1/0123 250/225 |
| 7,099,360 B2 * | 8/2006 | Bhowmik ............... | H01S 5/141 372/29.021 |
| 7,471,857 B2 * | 12/2008 | Kish et al. ....................... | 385/14 |
| 7,471,899 B2 * | 12/2008 | Kim ..................... | H04J 14/0226 398/63 |
| 7,522,845 B2 * | 4/2009 | Lautenschlager ..... | H01S 5/0687 372/32 |
| 2004/0179855 A1 * | 9/2004 | Harada ................... | H04J 14/02 398/197 |
| 2005/0123300 A1 * | 6/2005 | Kim ..................... | H04J 14/0226 398/84 |
| 2007/0154216 A1 * | 7/2007 | Kim ........................ | H04J 14/02 398/71 |
| 2008/0085118 A1 | 4/2008 | Effenberger | |

(Continued)

OTHER PUBLICATIONS

Roppelt M et al., "Tuning Methods for Uncooled Low-Cost Tunable Lasers in WDM-PON", 2011 Conference on Optical Fiber Communication—OFC 2011 Collocated National Fiber Optic Engineers Conference OFC/NFOEC 2011 IEEE Piscataway, NJ, USA, Mar. 6, 2011, p. 3 pp., XP000002658643, ISBN: 978-1-4577-0213-6.

(Continued)

*Primary Examiner* — Ken Vanderpuye  
*Assistant Examiner* — Amritbir Sandhu  
(74) *Attorney, Agent, or Firm* — Donald R. Boys; Central Coast Patent Agency, Inc.

(57) ABSTRACT

The invention relates to a method of operating a first optical network element (100), particularly an optical network unit, ONU, wherein said method comprises the following steps:  
performing a coarse tuning process (2100) of at least one transmission wavelength which is used by said first optical network element (100) for transmitting an optical signal to a second optical network element (200), particularly an optical line terminal, OLT, and  
performing a fine tuning process (2200) of said at least one transmission wavelength, wherein said fine tuning process (2200) is preferably performed after said coarse tuning process (2100).

2 Claims, 7 Drawing Sheets

(56) References Cited

U.S. PATENT DOCUMENTS

| | | | |
|---|---|---|---|
| 2008/0089699 A1* | 4/2008 | Li | H04J 14/0221 398/197 |
| 2009/0232493 A1* | 9/2009 | Tu | H04B 10/572 398/17 |
| 2010/0142956 A1* | 6/2010 | Larikova | H04B 10/2507 398/79 |
| 2011/0085794 A1* | 4/2011 | Lei | H04B 10/506 398/25 |
| 2011/0110661 A1* | 5/2011 | Grubor et al. | 398/38 |
| 2011/0116799 A1* | 5/2011 | Effenberger | G01M 11/3127 398/79 |
| 2011/0236017 A1* | 9/2011 | Ohlen | H04J 14/0282 398/34 |
| 2012/0070146 A1* | 3/2012 | Hinderthuer | H04B 10/07957 398/13 |
| 2012/0141135 A1* | 6/2012 | Yang | H04B 10/516 398/140 |
| 2012/0163816 A1* | 6/2012 | Sun | H04B 10/2543 398/63 |
| 2012/0251122 A1* | 10/2012 | Grobe | H04J 14/0221 398/95 |
| 2013/0064542 A1* | 3/2013 | Eiselt | H01S 5/0687 398/34 |
| 2013/0089324 A1* | 4/2013 | Eiselt | H04B 10/40 398/34 |
| 2013/0129355 A1* | 5/2013 | Tien | H04J 14/0246 398/72 |
| 2015/0063812 A1* | 3/2015 | Dove | H04Q 11/0067 398/67 |

OTHER PUBLICATIONS

Grobe K et al., "Cost and Energy Consumption Analysis of Advanced WDM-PONs", IEEE Communications Magazine IEEE USA, vol. 49, No. 2, Feb. 2011, pp. S25-S32, XP000002658644, ISSN: 0163-6804.

* cited by examiner

METHOD OF OPERATING AN OPTICAL NETWORK ELEMENT AND OPTICAL NETWORK ELEMENT

The present application claims priority to EP application 11160106.8, filed Mar. 29, 2011, which is incorporated herein in its entirety, at least by reference.

FIELD OF THE INVENTION

The invention relates to a method of operating an optical network element.

The invention further relates to an optical network element.

BACKGROUND

Optical network elements of the aforementioned type may generally be used for WDM (wavelength division multiplexing) network implementations, where data is e.g. transmitted via a basically passive optical network, PON, employing wavelength division multiplex techniques for increasing the transmission bandwidth that is available per optical fiber link.

Especially when operating an optical network element within a WDM system, it is very important to ensure that a transmission wavelength used by said optical network element precisely matches a specific WDM channel assigned for respective transmissions in order to avoid interference with other adjacent WDM channels.

Thus, it is an object of the present invention to improve a method of operating an optical network element and an optical network element in order to enable a precise matching of at least one transmission wavelength used by said optical network element for transmissions to a further optical network element, particularly on a respective WDM channel.

SUMMARY

According to the present invention, regarding the above-mentioned method of operating an optical network element, this object is achieved by performing a coarse tuning process of at least one transmission wavelength which is used by said first optical network element for transmitting an optical signal to a second optical network element, particularly an optical line terminal, OLT, and performing a fine tuning process of said at least one transmission wavelength, wherein said fine tuning process is preferably performed after said coarse tuning process.

Thus, the inventive method advantageously enables a two-stage wavelength tuning approach which offers increased operational flexibility. Moreover, the inventive concept advantageously enables to distribute various functional stages required for the tuning processes over several optical network elements, also cf. the following detailed description, which allows to share the respective functionality between a plurality of optical network elements to be tuned thus enabling a wavelength tuning solution which facilitates low-cost deployment and yet precise wavelength tuning.

Hence, the embodiments are particularly suited for wavelength tuning within WDM systems such as low-cost WDM PONS. Nevertheless, the inventive concept may also be applied to other architectures such as e.g. WDM P2P (peer-to-peer) links.

Generally, the two-stage approach according to the embodiments, which comprises the coarse tuning process and the fine tuning process, advantageously enables a particularly efficient wavelength tuning. For instance, in the context of a WDM system, the coarse tuning process may be employed to determine and set a correct WDM channel, i.e. transmission wavelength, for the transmitting optical network element. After that, the fine tuning process enables an even more precise tuning to the ideal transmission wavelength within the assigned WDM channel. Especially the fine tuning process may also be employed periodically after once having determined and set the correct "basic" transmission wavelength associated with a specific WDM channel in order to compensate temperature drifts and the like of a laser emitting said transmission wavelength.

According to a preferred embodiment, said coarse tuning process comprises: transmitting an optical signal from said first optical network element to said second optical network element by using a first transmission wavelength, receiving feedback information from said second optical network element at said first optical network element, wherein said feedback information comprises at least one of: information indicating at least one parameter for a step of coarse tuning to be performed within said first optical network element, information indicative of the fact that no coarse tuning is necessary.

I.e., within the coarse tuning process, the optical network element a transmitting laser of which is to be tuned may transmit a first optical signal to a second optical network element, wherein said second optical network element is configured for providing feedback information to said transmitting optical network element. For instance, initially, the first optical signal may be emitted by the optical network element at a first transmission wavelength which is associated to a WDM channel assigned to said optical network element. At this stage, the first transmission wavelength is not yet tuned. Upon receiving said first optical signal, the second optical network element may analyze the first optical signal received at the first, presently untuned, transmission wavelength, and may generate feedback information which is transmitted from the second network element to the first optical network element. Thereby, a first "tuning loop", i.e. a closed-loop, which is further referred to as "coarse tuning loop" is established, which is employed for the process of coarse tuning of said transmission wavelength of the transmitting laser of the first optical network element.

Said feedback information may comprises at least one of: information indicative of the fact that no coarse tuning is necessary, information indicating at least one parameter for a step of coarse tuning to be performed within said first optical network element.

In the first case, the first optical network element can directly derive from said feedback information that no coarse tuning is required, since the transmission wavelength sufficiently matches e.g. the assigned WDM wavelength. Thus, the first optical network element may proceed with the second stage, i.e. a process of fine tuning the transmission wavelength.

However, in most cases, an untuned transmission wavelength will not sufficiently match the assigned WDM wavelength. In this case, said feedback information comprises information indicating at least one parameter for a step of coarse tuning to be performed within said first optical network element. For instance, the second network element may determine, in the course of analyzing the received first optical signal, that the presently used transmission wavelength of the first optical network element differs from a desired center wavelength of an associated WDM channel by a certain wavelength error. The second network element may e.g. report back a value of said wavelength error to the first optical network element by means of the feedback information. Thus, the first optical network element may, upon receiving said feedback information, control the transmission wavelength of its laser to assume the desired wavelength value, i.e. the center wavelength of the assigned WDM channel to be used by said first optical network element.

According to a further preferred embodiment, said coarse tuning process further comprises altering said first transmission wavelength used by said first optical network element for transmitting said optical signal to said second optical network element by a predetermined amount, i.e. the value of said wavelength error, preferably depending on said feedback information received from said second optical network element, and repeating the steps of transmitting said optical signal and receiving feedback information until a predetermined break condition is reached, wherein said predetermined break condition preferably depends on at least one of: a maximum number of iterations for said process of coarse tuning, a difference between an actual value of said first transmission wavelength and a desired value of said first transmission wavelength, e.g. the value of said wavelength error.

Thus, the coarse tuning process may e.g. be performed iteratively by said first optical network element under assistance of said second optical network element, until said break condition is reached. For instance, a threshold value for said wavelength error may be defined for the coarse tuning process, and after said wavelength error is below said threshold, the coarse tuning process may be terminated. Eventually, a fine tuning process may follow.

According to a further embodiment, the fine tuning process comprises: transmitting an optical signal from said first optical network element to said second optical network element and/or a further optical network element by using a first transmission wavelength, receiving feedback information from said second optical network element and/or said further optical network element at said first optical network element, wherein said feedback information comprises at least one of: information indicating at least one parameter for a step of fine tuning to be performed within said first optical network element, information indicative of the fact that no fine tuning is necessary.

According to this embodiment, the fine tuning process is similar to the coarse tuning process regarding the steps of transmitting an optical signal by using said first transmission wavelength to be tuned and receiving feedback information. According to a first variant of the present embodiment, said optical signal may be transmitted from said first optical network element to said second optical network element, i.e. the network element which also provides feedback information within the coarse tuning process as already explained above.

However, according to a second variant of the present embodiment, said optical signal may also be transmitted from said first optical network element to a further optical network. This further network element, again, may analyze the optical signal at the transmission wavelength and may provide feedback information for fine tuning purposes to the first optical network element. Thus, a second "tuning loop", i.e. a closed-loop, which is further referred to as "fine tuning loop" is established, which is employed for the process of fine tuning of said transmission wavelength of the transmitting laser of the first optical network element.

It is to be noted, that, depending on the specific variant of the inventive embodiments, the fine tuning loop may comprise: a) the first optical network element and the second optical network element, or b) the first optical network element and a further optical network element, which is different from the second optical network element.

I.e., in case b), coarse tuning of a transmission wavelength used by said first optical network element may be performed by said first optical network element under assistance of the second optical network element, which may e.g. also operate as regular WDM communications "partner" of the first optical network element, whereas fine tuning of a transmission wavelength used by said first optical network element may be performed by said first optical network element under assistance of the further optical network element, which may e.g. be an intermediate optical network element that is arranged along an optical transmission path between the first optical network element and the second optical network element. Thus, in variant b), the inventive first optical network element to be tuned may receive feedback information for coarse tuning from the first optical network element and feedback information for fine tuning from the further optical network element.

For example, according to an embodiment, the first optical network element may be configured as an ONU of a WDM PON, whereas the second optical network element may be configured as an OLT of the same WDM PON. In this case, both the coarse tuning loop and the fine tuning loop may comprise, i.e. extend through, the ONU and the OLT.

According to a further embodiment, it is also possible to provide a "remote node" (RN), i.e. a further optical network element, which may be arranged in the same WDM PON as the above mentioned OLT and ONU. In this case, it is e.g. possible to establish a configuration wherein the coarse tuning loop comprises, i.e. extends through, the ONU and the OLT, whereas said fine tuning loop comprises, i.e. extends through, the ONU and the RN.

Generally, for configurations where only the coarse tuning loop comprises the ONU and the OLT, it is not necessary for the fine tuning loop to comprise the ONU and a RN, which is arranged between the ONU and the OLT. The fine tuning loop may rather also extend between ONU and a further optical network element which is not arranged between the ONU and the OLT, as long as a respective optical signal comprising the transmission wavelength to be fined tuned may be transmitted by the ONU to the further optical network element.

According to a further embodiment, said feedback information (for coarse and/or fine tuning) is transmitted from said second optical network element and/or said further optical network element to said first optical network element via a, preferably dedicated, control channel, wherein said control channel is preferably implemented in the form of a sideband transmission channel. Such a sideband transmission channel may e.g. be implemented in a per se known manner by a suitable amplitude modulation of an optical signal transmitted over an optical fiber between the involved components.

According to a further embodiment, said fine tuning process comprises: generating an optical signal by using said first transmission wavelength, locally analyzing said generated optical signal within said first optical network element, locally generating feedback information within said first optical network element, wherein said feedback information comprises at least one of: information indicating at least one parameter for a step of fine tuning to be performed within said first optical network element, information indicative of the fact that no fine tuning is necessary.

According to this embodiment, the fine tuning loop is completely integrated in the first optical network element, i.e. no interaction with further optical network elements is required for fine tuning. In the WDM context, such fine tuning may e.g. be implemented within an OLT and/or an ONU.

According to a further embodiment, for said process of fine tuning, said step of transmitting and/or generating an optical signal comprises transmitting and/or generating a frequency modulated (FM) dither signal. This FM dither signal may advantageously be transmitted from the first optical network element to be tuned to a second/further network element which is configured to analyze said FM dither signal and to provide feedback information to said first optical network element.

When employing a fine tuning loop which is directly integrated within said first optical network element, using such FM dither is also possible.

According to a further embodiment, said step of locally analyzing said generated optical signal within said first optical network element comprises transforming said frequency modulated dither signal to an amplitude modulated signal, preferably by means of an optical frequency discriminator, particularly a Fabry-Perot etalon. This technique may also be employed at the second or further optical network element for analyzing an optical signal comprising a transmission wavelength to be tuned, i.e. in such cases, where the fine tuning loop is not fully integrated within said first optical network element but rather extends through e.g. an ONU and an associated OLT or a RN or a further optical network element configured to support the first optical network element with said fine tuning.

According to a further embodiment, said coarse tuning process of said at least one transmission wavelength comprises altering said at least one transmission wavelength by about 0.1 nm to about 4.0 nm, and said fine tuning process of said at least one transmission wavelength comprises altering said at least one transmission wavelength by about 0.001 nm to about 0.1 nm. Thus, the method according to the embodiments may advantageously be employed for any type of WDM system (CWDM, DWDM, UDWDM) and offers increased operational flexibility due to the two-stage (coarse, fine) approach.

A further solution to the object of the present invention is given by an optical network element, particularly an optical network unit, ONU, wherein said optical network element is configured to perform the following steps: a coarse tuning process of at least one transmission wavelength which is used by said first optical network element for transmitting an optical signal to a second optical network element, particularly an optical line terminal, OLT, and a fine tuning process of said at least one transmission wavelength, wherein said fine tuning process is preferably performed after said coarse tuning process.

According to a further embodiment, however, it is also possible to perform the coarse tuning process and the fine tuning process independently of each other and/or only one process at a time, i.e. only coarse tuning or only fine tuning.

According to a further embodiment, said optical network element is configured to transmit an optical signal to said second optical network element by using a first transmission wavelength, receive feedback information from said second optical network element, wherein said feedback information comprises at least one of: information indicating at least one parameter for a step of coarse tuning to be performed within said first optical network element, information indicative of the fact that no coarse tuning is necessary, transmit an optical signal from said first optical network element to said second optical network element and/or a further optical network element by using said first transmission wavelength, and to receive feedback information from said second optical network element and/or said further optical network element, wherein said feedback information comprises at least one of: information indicating at least one parameter for a step of fine tuning to be performed within said first optical network element, information indicative of the fact that no fine tuning is necessary.

According to a further embodiment, said optical network element is configured to receive said feedback information from said second optical network element and/or said further optical network element via a, preferably dedicated, control channel, wherein said control channel is preferably implemented in the form of a sideband transmission channel, and wherein said optical network element is configured to tune said first transmission wavelength depending on feedback information received from said second optical network element and/or said further optical network element.

A further solution to the object of the present invention is given by an optical network element, particularly optical line terminal, OLT, for providing feedback information to another optical network element, particularly an optical network unit, ONU, on at least a first transmission wavelength that is used by said other optical network element for transmitting an optical signal to said optical network element. Such optical network element, which may e.g. represent the "second/further network element" in the sense of the above explained embodiments, is optimally suited to support the optical network element according to the above explained embodiments in the process of wavelength tuning due to its capability of returning feedback information for said tuning processes.

According to a further embodiment, said optical network element is configured to: analyze an optical signal received from said other network element and to provide feedback information related to said analyzed optical signal, and/or to transform a frequency modulated optical signal received from said other network element to an amplitude modulated optical signal, to analyze said amplitude modulated optical signal, and to provide feedback information related to said analyzed amplitude modulated optical signal.

A further solution to the object of the present invention is given by an optical transmission system comprising at least one first optical network element and at least one second optical network element.

Generally, an optical transmission system according to the present invention may comprise at least two optical network elements, wherein at least one optical network element is capable of performing the method according to the embodiments.

According to a further embodiment of the optical transmission system, said first and second network elements are connected via at least one optical fiber which comprises or is connected to a wavelength-selective filter. Said wavelength-selective filter may e.g. be provided in a remote node of a WDM PON.

According to a further embodiment of the optical transmission system, a coarse tuning loop for performing a coarse tuning process of at least one transmission wavelength which is used by said first optical network element for transmitting an optical signal to a second optical network element comprises said first optical network element and said second optical network element.

According to a further embodiment of the optical transmission system, a fine tuning loop for performing a fine tuning process of said at least one transmission wavelength comprises said first optical network element and said second optical network element, which is advantageous since the functionality provided within said second optical network element enabling to support the inventive tuning process may be shared by the first optical network element with other optical network elements, e.g. further ONUs of a WDM PON.

According to a further embodiment of the optical transmission system, a fine tuning loop for performing a fine tuning process of said at least one transmission wavelength comprises said first optical network element and a further optical network element, which is different from said second network element, or is integrated in said first optical network element, whereby no external device is required for the process of fine tuning.

Further features, aspects and advantages of the present invention are presented in the following detailed description with reference to the drawings in which:

FIG. 1 depicts a schematic block diagram of an inventive optical transmission system according to an embodiment, FIG. 2 depicts a simplified flow-chart of a method according to the embodiments, FIG. 3 depicts a simplified flow-chart of an embodiment of the inventive method, FIGS. 4a, 4b each depict a simplified flow-chart of further embodiments of the inventive method, FIG. 5 depicts a schematic block diagram of an inventive optical transmission system according to a further embodiment, wherein both a coarse tuning loop and a fine tuning loop extend through a first and second optical network element, FIG. 6 depicts a schematic block diagram of an inventive optical transmission system according to a further embodiment, wherein a coarse tuning loop extends through a first and second optical network element, and wherein a fine tuning loop is integrated in the second optical network element, FIG. 7 depicts a schematic block diagram of an inventive optical transmission system according to a further embodiment, wherein a coarse tuning loop extends through a first and second optical network element, and wherein a fine tuning loop extends through the first and a further optical network element, FIG. 8a depicts a communications diagram illustrating aspects of a coarse tuning process of a method according to an embodiment as implemented within a system according to FIG. 5, FIG. 8b depicts a communications diagram illustrating aspects of a fine tuning process of a method according to an embodiment as implemented within the system according to FIG. 5, and FIG. 9 depicts a simplified flow-chart of a further embodiment of the inventive method.

BRIEF DESCRIPTION OF THE FIGURES

FIG. 1 further depicts a wavelength-selective filter 300 which is arranged between the components 100, 200, presently between the fiber spans 400a, 400b, and which may e.g. serve to separate various wavelength channels of the WDM system 1000 from each other in a per se known manner. For this purpose, the wavelength-selective filter 300 may be implemented in the form of a cyclic AWG (arrayed waveguide grating). It is to be noted that the filter 300 is not necessary for applying the inventive principle according to some embodiments as further explained below; however, other embodiments of the invention may take advantage of such filter 300.

Figure 1:
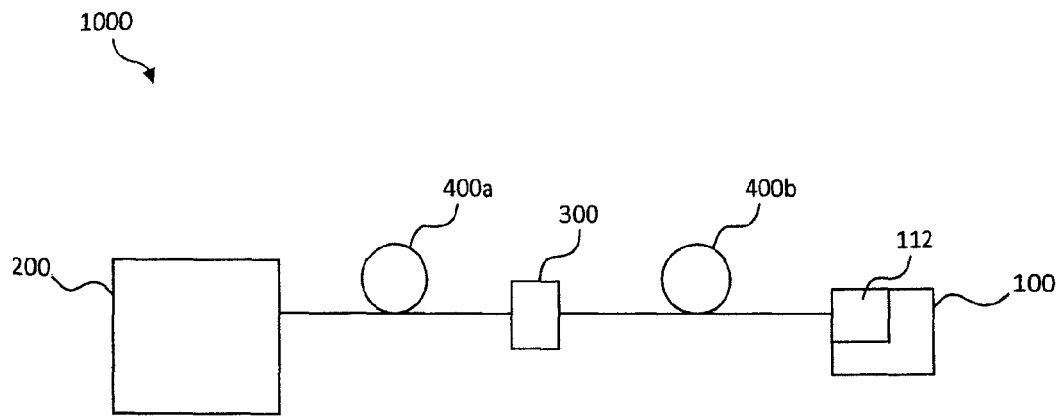
FIG. 1 depicts a schematic block diagram of an optical transmission system 1000 according to an embodiment. The optical transmission system 1000 may e.g. be configured as a WDM PON comprising a first optical network element 100, which is presently configured as an ONU, and a second optical network element 200, which is presently configured as an OLT of said WDM PON 1000. Two optical fiber spans 400a, 400b establish an optical connection between the ONU 100 and the OLT 200 in a per se known manner. The fiber spans 400a, 400b may e.g. be configured as SFW (single fiber working) system and be employed for optical data transmission between the components ONU 100, OLT 200 according to a WDM scheme. Further ONUS, which may also be connected to the OLT 200, are not depicted by FIG. 1 for the sake of clarity.

For optical signal transmissions from the ONU 100 to the OLT 200, the ONU 100 is equipped with at least one laser device 112 that is configured to generate an optical signal at a desired transmission wavelength. According to the WDM concept, the transmission wavelength to be used by the ONU 100 for transmissions to the OLT 200 is determined by a specific WDM channel that is assigned to the ONU 100. For example, such WDM channel assignment may e.g. be performed by the OLT 200 during an initialisation phase of the optical data transmission between the devices 100, 200.

According to the present embodiment, for upstream data transmissions, i.e. data transmissions from the ONU 100 to the OLT 200, via said fiber link 400a, 400b, the optical C-band (about 1530 nm to about 1565 nm) is employed, whereas for downstream data transmissions, i.e. data transmissions from the OLT 200 to the ONU 100, the optical L-band (about 1565 nm to about 1625 nm) is employed, which advantageously enables to use one single optical fiber 400a, 400b for both upstream and downstream transmissions simultaneously.

Different WDM schemes such as CWDM (coarse WDM) and/or DWDM (dense WDM) and/or UDWDM (ultra dense WDM) may be employed or combined, respectively, for upstream and/or downstream transmissions. However, of course, other configurations of the fiber link 400a, 400b are also possible and may be employed with the inventive principle of wavelength tuning as explained in detail below. Furthermore, the inventive principle is not limited to WDM applications but may rather also be used to perform wavelength tuning within single channel systems that only employ a single specific wavelength for data transmission between two optical network elements.

The laser device 112 of the ONU 100 is configured to generate an optical signal at a desired transmission wavelength, presently e.g. in the C-band wavelength range of about 1530 nm to about 1565 nm. The laser device 112 can be controlled regarding its output, i.e. transmission, wavelength, which may e.g. be implemented by using conventional wavelength control means for laser devices.

For the further descriptions, it is assumed that the transmission wavelength of the laser device 112 can be controlled electronically. Thus, the laser device 112 may e.g. dynamically be configured to, i.e. adjusted for, use within different WDM channels of the C-band. Further means for modifying optical signals generated by the laser device 112 such as e.g. external or internal modulators are per se known and may also be provided with the laser device 112 of the ONU 100.

To enable a precise matching of the transmission wavelength used by said ONU 100, which is provided by its laser device 112, and a WDM channel assigned to the ONU 100 for data transmission, the ONU 100 is configured to perform a process of wavelength tuning. According to a preferred embodiment, said process of wavelength tuning comprises: performing a coarse tuning process, cf. step 2100 of FIG. 2, of at least one transmission wavelength which is used by said ONU 100 for transmitting an optical signal to the OLT 200, and performing a fine tuning process, cf. step 2200 of FIG. 2, of said at least one transmission wavelength, wherein said fine tuning process 2200 is preferably performed after said coarse tuning process 2100.

Figure 2:
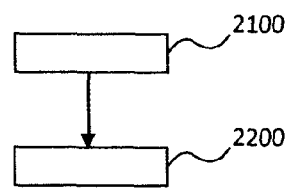

Thus, the inventive method as depicted by the flow-chart of FIG. 2 advantageously enables a two-stage wavelength tuning approach which offers increased operational flexibility since it enables using comparatively low-cost laser devices 112 without a dedicated wave locker for wavelength stabilization. Wavelength stability may rather be achieved by applying the inventive tuning processes 2100, 2200. Moreover, the inventive concept advantageously enables to distribute various functional stages required for the tuning processes over several optical network elements 100, 200, also cf. the following detailed description, which allows to share the respective functionality between a plurality of optical network elements 100, e.g. various ONUS 100 of a WDM PON 1000 and an OLT 200 of the WDM PON 1000 to which the various ONUS 100 are connected, to be tuned thus enabling a wavelength tuning solution which facilitates large-scale low-cost deployment and yet precise wavelength tuning.

For instance, some functional components for the inventive process of wavelength tuning may be implemented within the OLT 200 (FIG. 1) and may thus be available to further ONUS (not depicted) than only to the exemplarily depicted ONU 100. Thus, for a WDM PON 1000, it is not required to fully equip each ONU 100, . . . with a complete hardware and/or software functionality to perform wavelength tuning. Rather, the inventive principle enables a distributed wavelength tuning approach that advantageously allows to share required components/functionality and resources among various optical network elements 100, 200 at least to some extent, so that a WDM PON 1000 with low-cost laser devices 112 at least at the ONUS 100 may be provided.

Nevertheless, the inventive concept may also be applied to other architectures such as e.g. WDM P2P (peer-to-peer) links or even optical transmission systems only operating with a single wavelength.

Generally, the two-stage approach according to the embodiments, which comprises the coarse tuning process 2100 (FIG. 2) and the fine tuning process 2200, advantageously enables a particularly efficient wavelength tuning. For instance, in the context of the WDM system 1000 (FIG. 1), the coarse tuning process may be employed to determine and set a correct WDM channel, i.e. transmission wavelength, for the ONU 100. This ensures that future transmissions of the ONU 100 are performed within the correct WDM channel, i.e. wavelength range, as e.g. assigned to the ONU 100 by the OLT 200.

After that, the fine tuning process enables an even more precise tuning to the ideal transmission wavelength within the assigned WDM channel. Especially, the fine tuning process 2200 may also be employed periodically after once having determined and set the correct "basic" transmission wavelength associated with a specific WDM channel in order to compensate temperature drifts and the like of the laser device 112 (FIG. 1) emitting said transmission wavelength.

Figure 3:
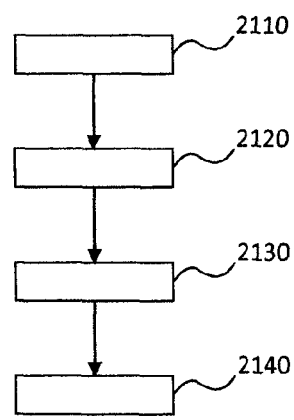

FIG. 3 depicts a simplified flow-chart of an embodiment of the inventive method. According to FIG. 3, the inventive coarse tuning process 2100 (FIG. 2) comprises transmitting, cf. step 2110, an optical signal from said ONU 100 to said OLT 200 by using a first transmission wavelength, i.e. the wavelength to which the ONU's laser device 112 has initially been set or adjusted.

Upon receiving the optical signal from said ONU 100 at the first transmission wavelength, the OLT 200 analyzes the first transmission wavelength, which may e.g. comprise a step of comparing said first transmission wavelength with a desired transmission wavelength that corresponds with a WDM channel that has been assigned to the ONU 100. Depending on said comparison, the OLT 200 transmits feedback information to the ONU 100. Said feedback information comprises at least one of: information indicating at least one parameter for a step of coarse tuning to be performed within said ONU 100 (e.g., a difference between the measured wavelength at the ONU 200 and the desired wavelength), information indicative of the fact that no coarse tuning is necessary at the ONU 100.

In step 2120, the ONU 100 receives the feedback information and evaluates whether any tuning or alteration of the first transmission wavelength is necessary, e.g. to better match the assigned WDM channel. If so, the ONU 100 in step 2130 correspondingly adapts the transmission wavelength of its laser device 112 for further data transmissions to the OLT 200.

The step 2130 of adapting or altering said first transmission wavelength used by said ONU 100 for transmitting optical signals to said OLT 200 is preferably performed depending on said feedback information received from the OLT 200 within the preceding step 2120.

According to step 2140 of FIG. 3, the ONU 100 may repeat the steps of transmitting 2110, receiving 2120 feedback information, and, eventually, of altering 2130 the transmission wavelength, until a predetermined break condition is reached, wherein said predetermined break condition preferably depends on at least one of: a maximum number of iterations for said process of coarse tuning 2100, a difference between an actual value of said first transmission wavelength and a desired value of said first transmission wavelength.

By employing the above explained procedure, an efficient closed-loop coarse tuning process for the transmission wavelength of the ONU 100 or its laser device 112, respectively, is provided.

The step of analyzing the optical signal which is transmitted from the ONU 100 to the OLT 200 may be performed by the OLT 200 in the following way: The OLT 200 may receive said optical signal having the first transmission wavelength and may measure the first transmission wavelength by means of appropriate measuring equipment (not shown). From the measuring results, feedback information for the ONU 100 may be derived. For this embodiment, the filter 300 of FIG. 1 is not required.

However, according to a particularly advantageous embodiment, the invention makes use of said wavelength-selective filter 300 arranged between the ONU 100 and the OLT 200, cf. FIG. 1. Since the wavelength-selective filter 300 within a WDM system may already provide for a bandpass filtering process of respective WDM channels, a wavelength error (i.e. deviation of the actual wavelength from the desired wavelength) of the first transmission wavelength used by the ONU 100 for transmitting an optical signal to the OLT 200 may be transformed into an amplitude difference of a corresponding optical power which is associated with said optical signal as received at the OLT 200. I.e., if the optical signal, which is transmitted from the ONU 100 to the OLT 200 within step 2110 (FIG. 3) of the present embodiment, has a first transmission wavelength which is not within the admissible wavelength range for the WDM channel assigned to the ONU 100 at all, the WDM channel filter 300 will attenuate the optical signal transmitted from the ONU 100 within step 2110 so that it cannot be detected at the OLT 200 anymore. In this case, the OLT 200 may conclude that the first transmission wavelength used within said step 2110 is completely wrong, i.e. not within the admissible wavelength range for the WDM channel assigned to the ONU 100. As a consequence, the OLT 200 may notify the ONU 100 of these results by means of the feedback information so that the ONU 100 can alter its transmission wavelength and initiate a further iteration of the method according to the embodiments.

However, depending on the specific filter characteristics of the filter 300, if the first transmission wavelength already is within the admissible wavelength range for the WDM channel assigned to the ONU 100, a correspondingly filtered optical signal with nonzero signal energy, or amplitude, respectively, will be detected by the OLT 200 upon the ONU's transmission to the OLT 200. In this case, the OLT 200 may conclude that the first transmission wavelength used within said step 2110 is at least partly within the admissible wavelength range for the WDM channel assigned to the ONU 100, although it may not coincide with an optimum center wavelength for the specific WDM channel. Thus, the OLT 200 may notify the ONU 100 accordingly, which, in turn, may either deem the currently set transmission wavelength to be acceptable or perform a further iteration of the inventive method which aims at optimizing the transmission wavelength in the context of the coarse tuning process 2100.

The above explained method of analyzing an optical signal as received at the OLT 200 from the ONU 100 is particularly advantageous since it makes use of the filter 300 which is usually already provided within conventional WDM PONS thus reducing the hardware effort at the OLT 200, which is proposed to support the ONU 100 with the inventive wavelength tuning process. More specifically, by utilizing an existing WDM channel filter 300, the OLT 200 is not required to perform a comparatively difficult frequency analysis (e.g., spectral analysis), but may rather only perform a comparatively simple and efficient analysis of the received optical power, i.e. by comparing an amplitude of the received signal with a predetermined threshold.

I.e., when employing the filter 300 for the inventive coarse tuning, the problem of determining the desired wavelength is advantageously transformed to the problem of maximizing a receive power of the filtered signal at the OLT 200 which facilitates efficient processing within the OLT 200.

Of course, the amplitude of a received signal also depends on the attenuation of the optical fiber spans 400a, 400b (FIG. 1) and of other components that may be provided within the respective optical transmission path. However, such influences, as well as e.g. a filter characteristic of the WDM filter 300, may be assessed once, e.g. during the deployment of the system 1000, or periodically in service intervals, and may be taken into consideration for analyzing the received signals at the OLT 200 for the process of wavelength tuning 2100, 2200.

After that, i.e. after ensuring that the transmission wavelength as used by the ONU 100 for upstream transmissions to the OLT 200, is within an acceptable wavelength range, i.e. within the correct WDM channel, a further tuning stage, namely the process 2200 (FIG. 2) of fine-tuning the transmission wavelength of the ONU's laser device 112 may be performed.

Figure 4A:
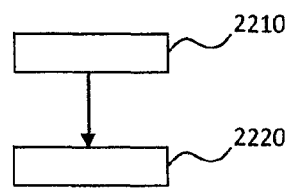

FIG. 4a depicts a simplified flow-chart of a further embodiment of the inventive method, which relates to the process of fine-tuning the transmission wavelength. In a first step 2210, the ONU 100 transmits an optical signal to the OLT 200. As such, step 2210 is similar to step 2110 of the coarse tuning procedure 2100 (FIG. 2). Upon receiving the optical signal which has been transmitted from the ONU 100 to the OLT 200, the OLT 200 may analyze the received optical signal.

If, preceding to step 2210 according to FIG. 4a, a process 2100 of coarse tuning has been performed by the ONU 100, the transmission wavelength used by the ONU 100 for transmitting the optical signal to the OLT 200 within step 2210 of the fine-tuning process may already be sufficiently centered within a respective WDM channel assigned to the ONU 100 for its upstream transmissions to the OLT 200.

However, in order to even further increase the precise setting of the transmission wavelength at the ONU 100, after step 2210, the OLT 200 analyzes the received optical signal. Preferably, for this further process of analyzing, which aims at fine-tuning the transmission wavelength of the ONU 100 or its laser device 112 (FIG. 1), respectively, a more precise analyzing technique is employed by the OLT 200.

According to a preferred embodiment, within said step 2210, the ONU 100 transmits an optical frequency modulated (FM) dither signal to the OLT 200. Such FM dither signal may be generated by the ONU 100 in a per se known manner, i.e. by frequency modulating an input signal to the ONU's laser device 112. As such, the FM dither signal may be transmitted simultaneously to an eventually ongoing user data transmission from the ONU 100 to the OLT 200, whereby no interruption of a regular operation of the devices 100, 200 is required for the inventive fine tuning process 2200 (FIG. 2). The same holds true for the coarse tuning process 2100, because, in principle, any upstream optical signal may be employed by the ONU 100 to "notify" the OLT 200 of its current transmission wavelength.

Preferred dither frequencies for the FM dither signal are in the 10 kHz to 400 kHz range, preferably around 100 kHz, i.e. a nominal optical transmission signal of the ONU 100 is additionally frequency modulated by said dither frequency for the step 2210 for fine tuning. Said frequency modulation may e.g. be achieved by correspondingly modifying an electrical input signal to the laser device 112 of the ONU 100.

After receiving said FM dither signal from the ONU 100, the OLT 200 analyzes the received FM dither signal in order to determine a wavelength deviation of the received signal from a desired transmission wavelength for the ONU 100.

According to a preferred embodiment, for the step of analyzing, the OLT 200 transforms said received FM dither signal to an amplitude modulated (AM) signal, preferably by means of an optical frequency discriminator, particularly a Fabry-Perot etalon. I.e., the optical frequency discriminator outputs an AM signal which comprises information on a wavelength deviation between an actually employed transmission wavelength of the ONU 100 and the desired transmission wavelength of the ONU 100, e.g. a center wavelength of the used WDM channel. This output signal of the frequency discriminator is evaluated by the OLT 200, and corresponding feedback information is returned from the OLT 200 to the ONU 100 to notify the ONU 100 in which way (increase, decrease) its transmission wavelength should be altered to minimize the wavelength deviation.

Upon receiving, cf. step 2220 of FIG. 4a, the feedback information from the OLT 200, the ONU 100 may alter its currently set transmission wavelength in order to minimize the wavelength deviation.

In analogy to the steps 2110, 2120, 2130, 2140 of the wavelength coarse tuning procedure as depicted by FIG. 3, the above explained steps 2210, 2220, . . . of the wavelength fine tuning procedure may also be iteratively repeated until a predetermined break condition (i.e., maximum number of iterations or sufficiently small wavelength deviation attained) is met.

According to a preferred embodiment, both tuning processes 2100, 2200 (FIG. 2), but especially the fine tuning process 2200, may also be employed periodically. E.g., after once the correct transmission wavelength for an assigned WDM channel of the ONU 100 has been set by the ONU 100 employing the coarse tuning process 2100, the fine tuning process 2200 may repeatedly be executed to keep the wavelength deviation below a predetermined threshold. Thus, wavelength drifts of the ONU's laser device, which may be due to temperature changes or the like may advantageously be compensated.

According to a further embodiment, the feedback information is transmitted from the OLT 200 to the ONU 100 via a, preferably dedicated, control channel, wherein said control channel is preferably implemented in the form of a sideband transmission channel. Such a sideband transmission channel may e.g. be implemented in a per se known manner by a suitable amplitude modulation of an optical signal transmitted over an optical fiber between the involved components 100, 200.

Figure 4B:
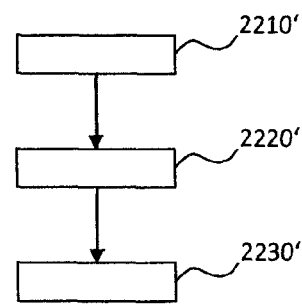

This way, the feedback information of both the coarse tuning process 2100 (FIG. 4) and the fine tuning process 2200 may efficiently be forwarded by the OLT 200 to the ONU 100 in a downstream transmission via the same optical link 400a, 400b which is also employed for upstream transmissions from the ONU 100 to the OLT 200.

Generally, any other data transmission mechanism may also be employed to forward said feedback information from the OLT 200 to the ONU 100.

According to the embodiments explained above, a first tuning loop, namely a coarse tuning loop, may be implemented in form of the ONU 100 and the OLT 200 for coarse tuning the transmission wavelength of the ONU 100. I.e., the ONU 100 transmits an optical signal at the transmission wavelength to be tuned to the OLT 200 and receives corresponding feedback information from the OLT 200, whereupon the ONU 100 may alter its transmission wavelength. Iteratively repeating said process may also be provided by said coarse tuning loop.

Likewise, according to the embodiments explained above, a second tuning loop, namely a fine tuning loop, may be implemented in form of the ONU 100 and the same OLT 200 for fine tuning the transmission wavelength of the ONU 100. I.e., the ONU 100 transmits an optical signal at the transmission wavelength, which may already have been coarse-tuned by the procedure 2100 of FIG. 2, to be further fine-tuned to the OLT 200 and receives corresponding feedback information from the OLT 200, whereupon the ONU 100 may further alter its transmission wavelength in the sense of fine-tuning. Iteratively repeating said process may also be provided by said fine tuning loop.

According to a preferred embodiment, both said coarse tuning loop and said fine tuning loop are implemented by employing the devices 100, 200. I.e., the OLT 200 delivers feedback information to the ONU 100 both for coarse tuning and for fine tuning.

However, according to a further preferred embodiment, in step 2210, said optical signal may also be transmitted from the ONU 100 (FIG. 1) to a further optical network element (not depicted by FIG. 1) for the purpose of fine tuning the ONU's transmission wavelength. This further network element may analyze the optical signal at the transmission wavelength and may provide feedback information for fine tuning purposes to the ONU 100 as has been described above for the OLT 200. Thus, in the present embodiment, the coarse tuning loop involves the ONU 100 and the OLT 200, whereas the fine tuning loop involves the ONU 100 and a further network element, which is different from the OLT 200, rather than the OLT 200.

Hence, depending on the specific variant of the inventive embodiments, the fine tuning loop may comprise: a) the first optical network element, i.e. the ONU 100 (FIG. 1), and the second optical network element, i.e. the OLT 200, or b) the first optical network element (ONU 100) and a further optical network element (not shown in FIG. 1), which is different from the second optical network element.

I.e., in case b), coarse tuning of a transmission wavelength used by said ONU 100 may be performed by said ONU 100 under assistance of the OLT 200, which may e.g. also operate as regular communications "partner" of the ONU 100 in the context of the WDM PON 1000, whereas fine tuning of a transmission wavelength used by said ONU 100 may be performed by said ONU 100 under assistance of the further optical network element, which may e.g. be an intermediate optical network element that is arranged along an optical transmission path between the ONU 100 and the OLT 200, e.g. a so-called remote node (RN). Thus, in variant b), the inventive first optical network element (ONU 100) to be tuned may receive feedback information for coarse tuning from the second optical network element (OLT 200) and feedback information for fine tuning from the further optical network element.

In other words, the first optical network element 100 may be configured as an ONU of a WDM PON, whereas the second optical network element 200 may be configured as an OLT of the same WDM PON 1000. In this case, both the coarse tuning loop and the fine tuning loop may comprise, i.e. extend through, the ONU 100 and the OLT 200.

According to a further embodiment, it is also possible to provide a "remote node" (RN), i.e. a further optical network element, which may be arranged in the same WDM PON as the above mentioned OLT and ONU. In this case, it is e.g. possible to establish a configuration wherein the coarse tuning loop comprises, i.e. extends through, the ONU and the OLT, whereas said fine tuning loop comprises, i.e. extends through, the ONU and the RN.

Generally, for configurations where only the coarse tuning loop comprises the ONU 100 and the OLT 200, it is not necessary for the fine tuning loop to comprise the ONU and a RN, which is arranged between the ONU 100 and the OLT 200. The fine tuning loop may rather also extend between ONU 100 and a further optical network element which is not arranged between the ONU and the OLT, as long as a respective optical signal comprising the transmission wavelength to be fined tuned may be transmitted by the ONU 100 to the further optical network element.

Figure 5:
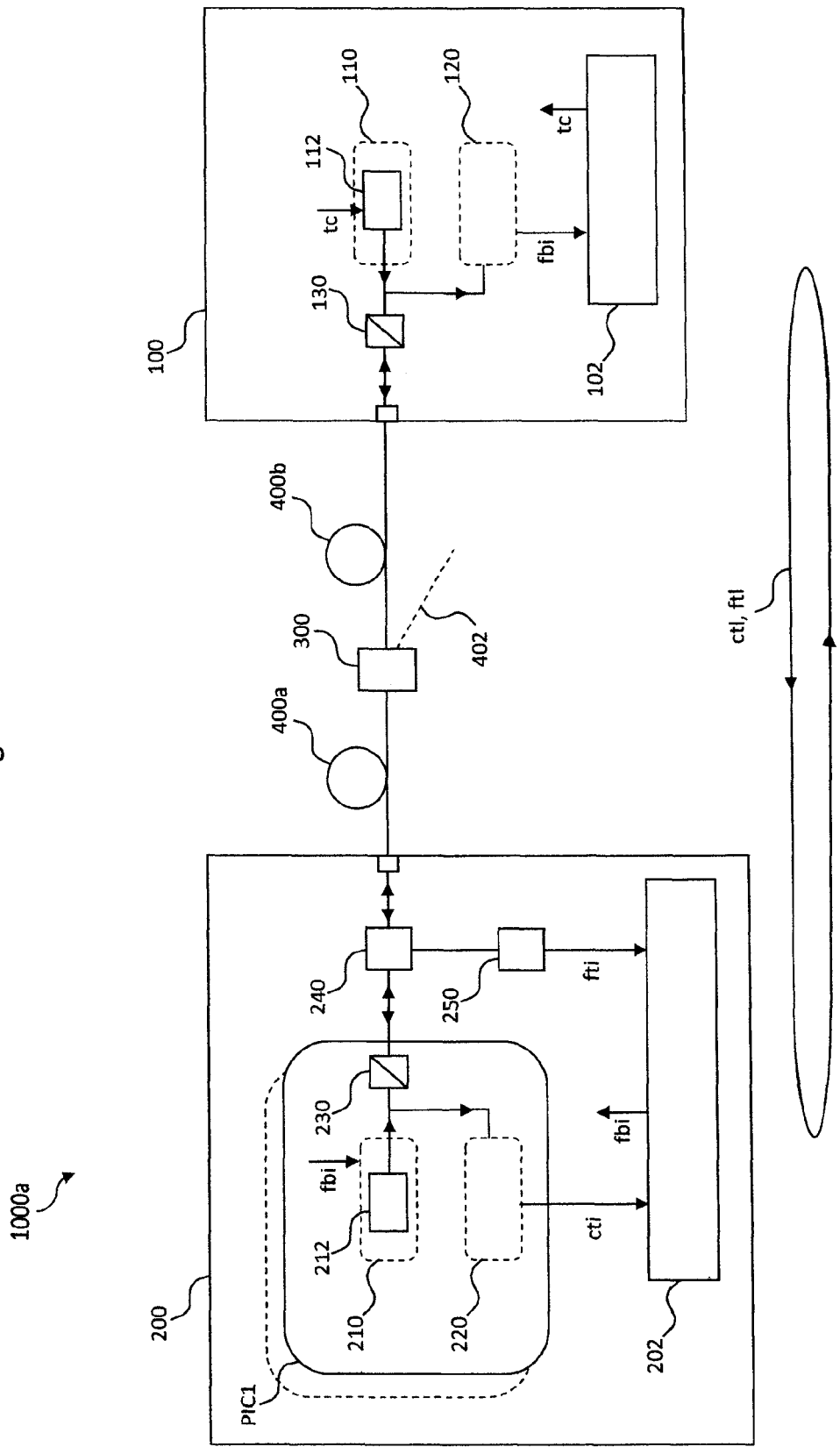

FIG. 5 depicts a schematic block diagram of an inventive optical transmission system 1000a according to a further embodiment, wherein both a coarse tuning loop ctl and a fine tuning loop ftl extend through a first optical network element 100 and a second optical network element 200.

In analogy to the embodiment according to FIG. 1, the optical transmission system 1000a may be a WDM PON, and the first optical network element 100 may be one of—possibly many—ONUs of said WDM PON 1000a, and said second optical network element 200 is an OLT of said WDM PON 1000a.

The configuration of the optical link between ONU 100 and OLT 200 is identical to FIG. 1, i.e. comprising two optical fiber spans 400a, 400b, e.g. according to the SFW (single fiber working) principle, and a WDM channel filter 300 arranged between the fiber spans 400a, 400b. Additionally, a further optical connection from the filter 300 is symbolized by the dashed line 402 to point out that instead of a single ONU 100, a plurality of ONUS may be connected to the filter 300, or a remote node comprising said filter 300, to form a complex WDM PON which e.g. comprises tree topology. For instance, several hundred ONUS may be connected to a remote node, which may also comprise the WDM filter 300, and said remote node may be connected via the first fiber span 400a to the OLT 200. Thus, generally, the inventive principle of wavelength tuning may advantageously be applied to a plurality of ONUS 100 attached to the OLT 200, wherein, advantageously, the related resources of the OLT 200 (for analyzing a wavelength of received signals, transmitting feedback information to specific ONUS, and the like) for wavelength tuning may be shared between the ONUS.

The ONU 100 depicted by FIG. 5 comprises a control unit 102 which controls an operation of the ONU 100. Particularly, the control unit 102 may control an optical transmit path 110 and/or an optical receive path 120, which are connected via an optical diplexer 130 to an optical port of the ONU 100 that is attached to the fiber span 400b. Thus, downstream optical signals received at the ONU 100, i.e. from the OLT 200, can be forwarded to the optical receive path 120, whereas upstream optical signals may be transmitted to the OLT 200 via the optical transmit path 110.

For generating the optical signals to be transmitted, the transmit path 110 comprises a laser device 112 a transmission wavelength of which can be tuned, e.g. electrically. Tuning may e.g. be performed by said control unit 102 providing a respective tuning control signal tc to the laser device 112.

For receiving and evaluating feedback information fbi that is e.g. forwarded from the OLT 200 to the ONU 100 during the wavelength tuning processes 2100, 2200 (FIG. 2) according to the embodiments, a respective signal connection fbi (FIG. 5) is provided from the optical receive path 120 to the control unit 102. Thus, the control unit 102 may evaluate received feedback information fbi and e.g. apply a specific tuning control signal tc to the laser device 112 for altering the transmission wavelength.

The OLT 200 comprises a control unit 202 which controls an operation of the OLT 200. Particularly, the control unit 202 may control an optical transmit path 210 and/or an optical receive path 220 of the OLT 200, which are connected via an optical diplexer 230 to an optical port of the OLT 200 that is attached to the fiber span 400a. Thus, upstream optical signals received at the OLT 200, i.e. from the ONU 100, can be forwarded to the optical receive path 220, whereas downstream optical signals may be transmitted to the ONU 100 via the optical transmit path 210.

Between the diplexer 230 and the optical port of OLT 200, an optical coupler 240 is arranged which couples a portion of an optical signal received at the OLT 200 to an optical frequency discriminator 250, particularly a Fabry-Perot etalon.

For receiving and evaluating coarse tuning information cti, that e.g. corresponds with the optical signal transmitted by the ONU 100 to the OLT 200 in step 2110 of coarse tuning, cf. FIG. 3, a respective signal connection denoted as "cti" (FIG. 5) is provided from the optical receive path 220 to the control unit 202. This way, the control unit 202 may be provided with information required for a coarse tuning process, such as e.g. an actual transmission wavelength as used by the ONU 100 for its transmission to the OLT 200.

Since the WDM PON 1000a of FIG. 5 comprises a WDM channel filter 300 that may already provide for a bandpass filtering process of respective WDM channels, a wavelength error (i.e. deviation of the actual wavelength from the desired wavelength) of the first transmission wavelength used by the ONU 100 for transmitting an optical signal to the OLT 200 may be transformed into an amplitude difference of a corresponding optical power which is associated with said optical signal as received at the OLT 200. Thus, the coarse tuning information cti forwarded from the receive path 220 to the control unit 202 may e.g. depend on a detected wavelength error, or amplitude difference, as already explained above.

Depending on the coarse tuning information cti, the OLT 200 may generate feedback information fbi for the ONU 100, which may be provided from the control unit 202 to the transmit path 210 for transmission to the ONU 100.

According to an embodiment, the feedback information fbi may be transmitted from the OLT 200 to the ONU 100 via a, preferably dedicated, control channel, wherein said control channel is preferably implemented in the form of a sideband transmission channel. Such a sideband transmission channel may e.g. be implemented in a per se known manner by a suitable amplitude modulation of an optical signal generated by the OLT's laser device 212.

As already explained above, the coarse tuning information cti, which forms the basis of the determination of feedback information for a coarse tuning process at the OLT 200, is obtained from the optical receive path 220 of the OLT 200 by means of suitable signal processing, i.e. wavelength/frequency analysis or amplitude analysis when employing a WDM filter 300 for filtering signals transmitted from the ONU 100 to the OLT 200.

In contrast, fine tuning information fti is obtained within the OLT 200 at an output of the etalon 250. I.e., after converting an FM dither signal received at the OLT 200 from the ONU 100, the coupler 240 couples a portion of the received signal to the etalon 250 which transforms the FM dither signal portion into an AM signal an amplitude of which carries information of a wavelength deviation of the ONU's transmission wavelength in the sense of the fine tuning process. Thus, the fine tuning information obtained at the output of the etalon 250 is forwarded to the control unit 202 for further processing, such as e.g. generating fine-tuning related feedback information, which, in analogy to the coarse-tuning related feedback information, may be forwarded by the control unit 202 by means of the control link fbi that enables modifying a downstream optical signal to the ONU 100 in a manner already explained above (i.e., providing an AM sideband transmission channel of the optical signal transmitted from the OLT 200 to the ONU 100).

However, it is also possible to transmit the fine-tuning related feedback information and the coarse-tuning related feedback information from the OLT 200 to the ONU 100 via different channels.

The WDM PON 1000a of FIG. 5 may advantageously operate according to the embodiments of the inventive method that have already been explained above with reference to FIGS. 2, 3, 4.

The control units 102, 202 of the ONU 100 and the OLT 200 may e.g. comprise calculating units such as at least one of: a microprocessor, a digital signal processor (DSP). Additional components such as photo diodes, an analog-to-digital converter (ADC) or means for frequency analysis may also be provided and/or implemented within said control unit(s) 102, 202.

Especially, according to the WDM PON embodiment 1000a depicted by FIG. 5, the control unit 202 of the OLT 200 may use an ADC to convert the received coarse tuning information cti and fine tuning information fti to the digital domain for further processing by e.g. a DSP.

A particularly advantageous construction of the OLT 200 is obtained if the components 210, 212, 220, 230 are integrated together in form of a photonic integrated circuit (PIC), cf. e.g. the component group PIC1 of the OLT 200. Further PICS, cf. the dashed rectangle of FIG. 5, may also be provided at the OLT 200 for enabling parallel execution of the OLT-based steps of wavelength tuning for a plurality of upstream optical transmissions, whereby e.g. a plurality of ONUS 100 can simultaneously be tuned regarding their transmission wavelengths by means of the OLT 200. Possibly, the etalon 250 or another suitable frequency discriminator 250 may also be integrated into a PIC.

Advantageously, the above explained frequency discrimination mechanism enabled by the device 250 may be shared between multiple WDM wavelength channels and the associated ONUS 100.

In addition to the feedback information fbi transmitted from the OLT 200 to the ONU 100, a comparable control channel (e.g. further AM sideband channel) may also be established for transmitting control information from the ONU 100 to the OLT 200. Thus, temperature readouts of the OLT's laser device 112, operational parameters related to the wavelength tuning process(es) 2100, 2200 (FIG. 2), and the like may be transmitted to the OLT 200.

Figure 8A:
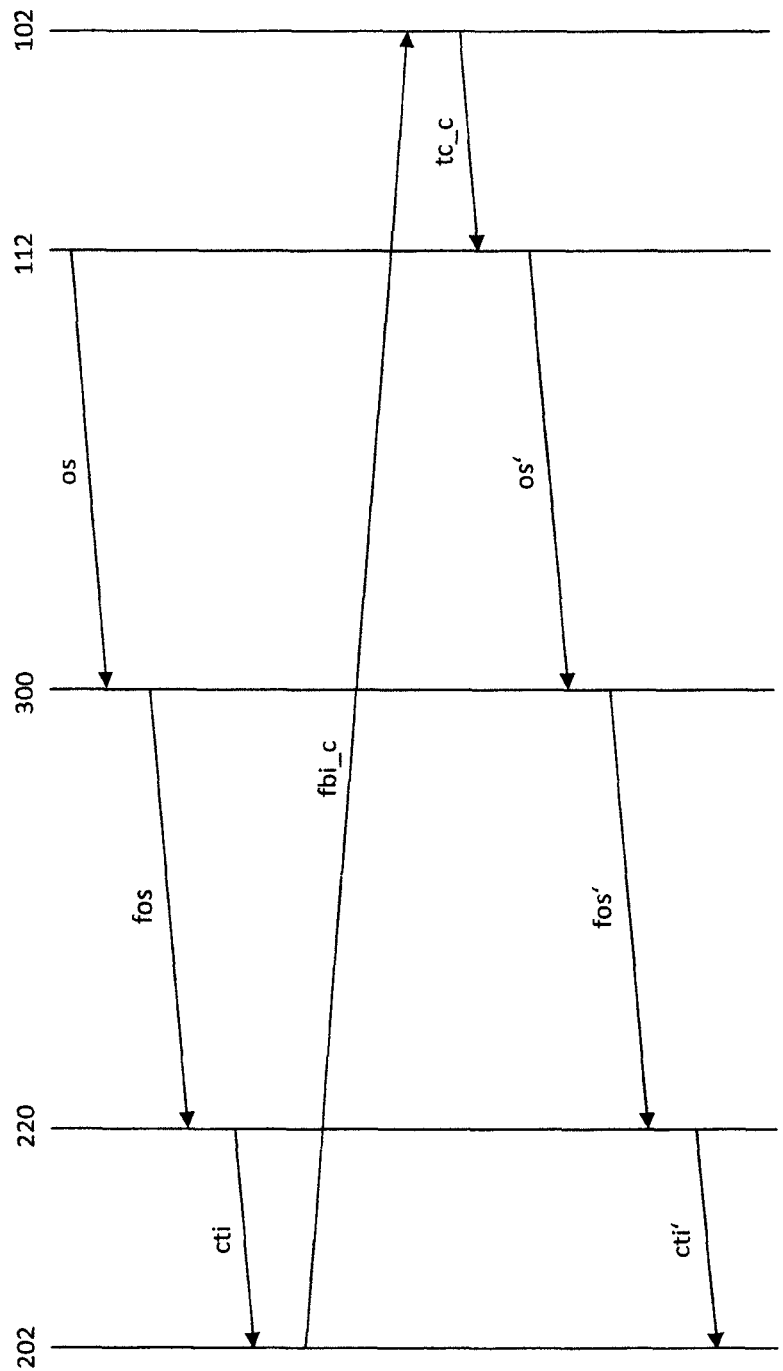

FIG. 8a depicts a communications diagram illustrating aspects of a coarse tuning process of a method according to an embodiment as implemented within the WDM PON 1000a according to FIG. 5.

In a first step, e.g. step 2110 of FIG. 3, an optical signal os is transmitted from the ONU's laser device 112 (FIG. 5) to the WDM channel filter 300 via the fiber span 400b. At an output of the WDM channel filter 300, a correspondingly filtered optical signal fos is obtained, which is forwarded to the OLT 200 via the fiber span 400a. At the optical receive path 220 of the OLT 200, the filtered optical signal fos is received, and coarse tuning information cti is extracted, or generally derived, therefrom, e.g. by wavelength and/or amplitude analysis as already explained above. The coarse tuning information cti may e.g. characterize a wavelength deviation of the currently used transmission wavelength from a desired transmission wavelength for a WDM channel assigned to the ONU 100. The coarse tuning information cti is forwarded to the control unit 202, which determines feedback information fbi_c for the ONU 100, which is suitable for coarse wavelength tuning, depending on said coarse tuning information cti.

It is evident that one or more signal transmissions from the ONU 100 to the OLT 200 may be performed prior to determining said feedback information fbi_c, which e.g. enables to utilize statistical analysis approaches within the OLT 200 for wavelength and/or amplitude analysis.

After generating the feedback information fbi_c, it is transmitted from the OLT 200, or its control unit 202, to the control unit 102 of the ONU 100, e.g. via the already explained control channel (i.e., an AM sideband channel, which is added to the regular WDM channels transmitted via the link 400a, 400b). Upon receiving said feedback information fbi_c, the control unit 102 of the ONU 100 evaluates said feedback information fbi_c and eventually performs a step of wavelength tuning, e.g. altering the transmission wavelength of its laser device 112 (FIG. 5), preferably depending on the evaluated feedback information fbi_c. This is symbolized by the arrow tc_c of FIG. 8a which represents a wavelength control process. The arrow tc_c insofar corresponds with step 2130 of the method according to FIG. 3.

After that, a further optical signal os', which comprises a tuned transmission wavelength, is transmitted to the filter 300, where it is filtered and forwarded in form of the filtered signal fos' to the receive path 220 of the OLT 200. Irrespective of the actual analyzing approach (direct determination of the transmission wavelength, amplitude analysis of the received filtered signal, or alternative approaches) implemented in the OLT 200, the OLT 200 derives a new set cti' of coarse tuning information from said received filtered signal fos', which most probably indicates that the tuned transmission wavelength used for the signal os' by the ONU 100 comprises a smaller deviation from the desired transmission wavelength than the previous transmission wavelength used for the signal os by the ONU 100. After that, the OLT 200 may again return corresponding feedback information to the ONU 100 for iteratively continuing the process of coarse tuning.

Figure 8B:
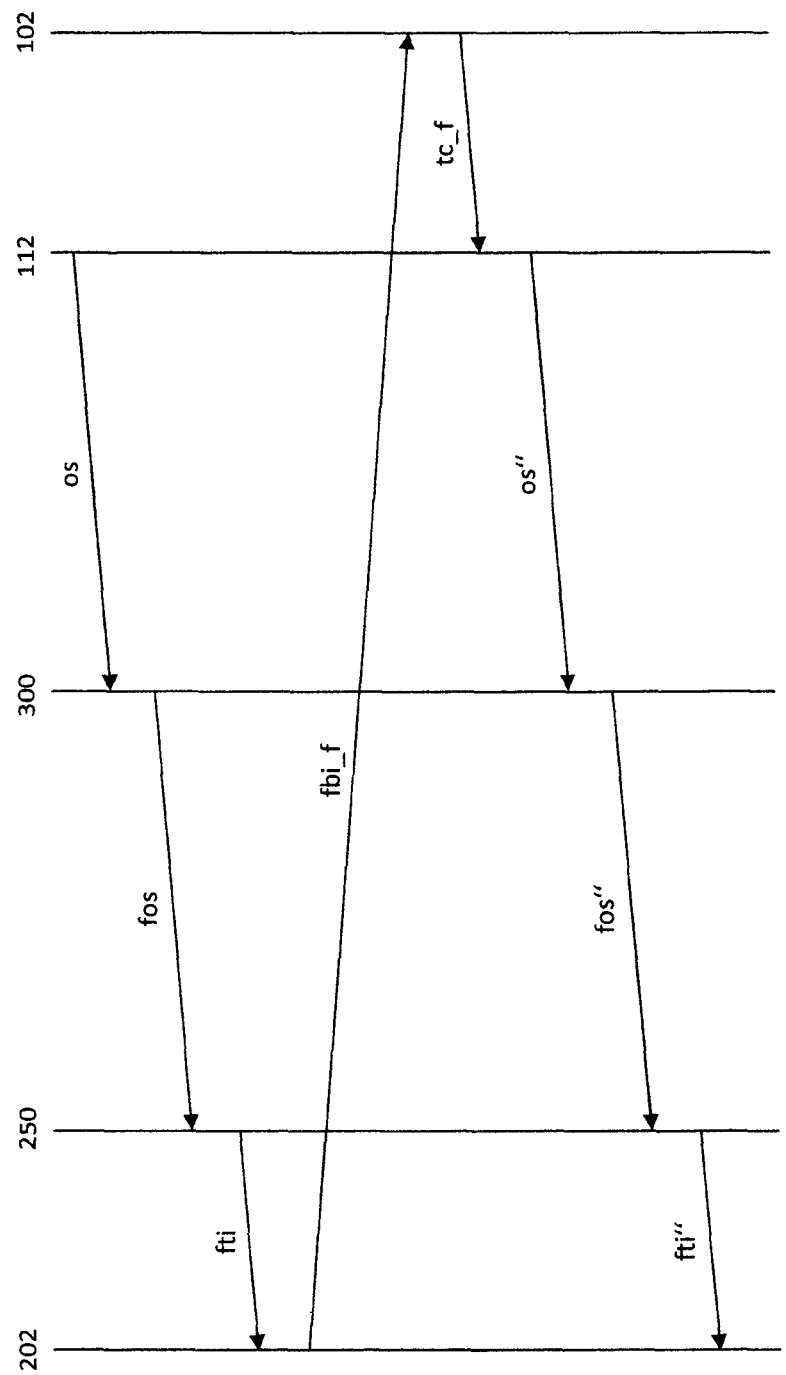

FIG. 8b depicts a communications diagram illustrating aspects of a fine tuning process of a method according to an embodiment as implemented within the WDM PON 1000a according to FIG. 5. This fine tuning process may e.g. be performed after the coarse tuning process explained above with reference to FIG. 8a.

In a first step, e.g. step 2210 of FIG. 4a, an optical signal os, which e.g. comprises an FM dither signal, is transmitted from the ONU's laser device 112 (FIG. 5) to the WDM channel filter 300 via the fiber span 400b. At an output of the WDM channel filter 300, a correspondingly filtered optical signal fos is obtained, which is forwarded to the OLT 200 via the fiber span 400a. A portion of said filtered optical signal fos is coupled by means of the coupler 240 to the etalon 250, where it is processed as already explained above, e.g. in the sense of transforming the FM dither signal portion into an AM signal for evaluation by the control unit 202. Hence, fine tuning information fti, which comprises said AM signal or generally depends on said received FM dither signal portion, can be forwarded to the control unit 202.

The fine tuning information fti may e.g. characterize a wavelength deviation of the currently used transmission wavelength from a desired transmission wavelength for a WDM channel assigned to the ONU 100 in the order of precision required within the process of fine tuning, in contrast to the process of coarse tuning. After receiving the fine tuning information fti, the control unit 202 determines feedback information fbi_f for the ONU 100, which is suitable for fine wavelength tuning, depending on said fine tuning information fti.

It is evident that one or more signal transmissions from the ONU 100 to the OLT 200 may be performed prior to determining said feedback information fbi_f, which e.g. enables to utilize statistical analysis approaches within the OLT 200 for wavelength and/or amplitude analysis.

After generating the feedback information fbi_f, it is transmitted from the OLT 200, or its control unit 202, to the control unit 102 of the ONU 100, e.g. via the already explained control channel (i.e., an AM sideband channel, which is added to the regular WDM channels transmitted via the link 400a, 400b). Upon receiving said feedback information fbi_f, the control unit 102 of the ONU 100 evaluates said feedback information fbi_f and eventually performs a step of wavelength tuning, e.g. altering the transmission wavelength of its laser device 112 (FIG. 5), preferably depending on the evaluated feedback information fbi_f. This is symbolized by the arrow tc_f of FIG. 8b which represents a wavelength control process.

After that, a further optical signal os", which comprises a fine tuned transmission wavelength, is transmitted to the filter 300, where it is filtered and forwarded in form of the filtered signal fos" to the etalon 250 of the OLT 200. The OLT 200 derives a new set fti" of fine tuning information from said received filtered signal fos", which most probably indicates that the tuned transmission wavelength used for the signal os" by the ONU 100 comprises an even smaller deviation from the desired transmission wavelength than the previous transmission wavelength used for the signal os by the ONU 100. After that, the OLT 200 may again return corresponding feedback information to the ONU 100 for iteratively continuing the process of fine tuning.

Although the inventive principle as illustrated by the system 1000a of FIG. 5 focuses on tuning the transmission wavelength of the laser device 112 of the ONU 100, it may alternatively or additionally be applied to a laser device 212 comprised in the OLT 200. In this case, the respective signal flows have to be modified, i.e. inverted, and the arrangement of involved hardware is to be changed correspondingly. For instance, as far as fine tuning is concerned, the ONU 100 may be equipped with a frequency discriminator and corresponding functionality within its control unit 102 to analyze an FM dither signal sent from the OLT 200 to the ONU 100 for the purpose of tuning a transmission wavelength of the OLT's laser device 212. Means for frequency analysis and/or amplitude analysis in the context of coarse wavelength tuning, of course, may also be provided at the ONU 100.

Figure 6:
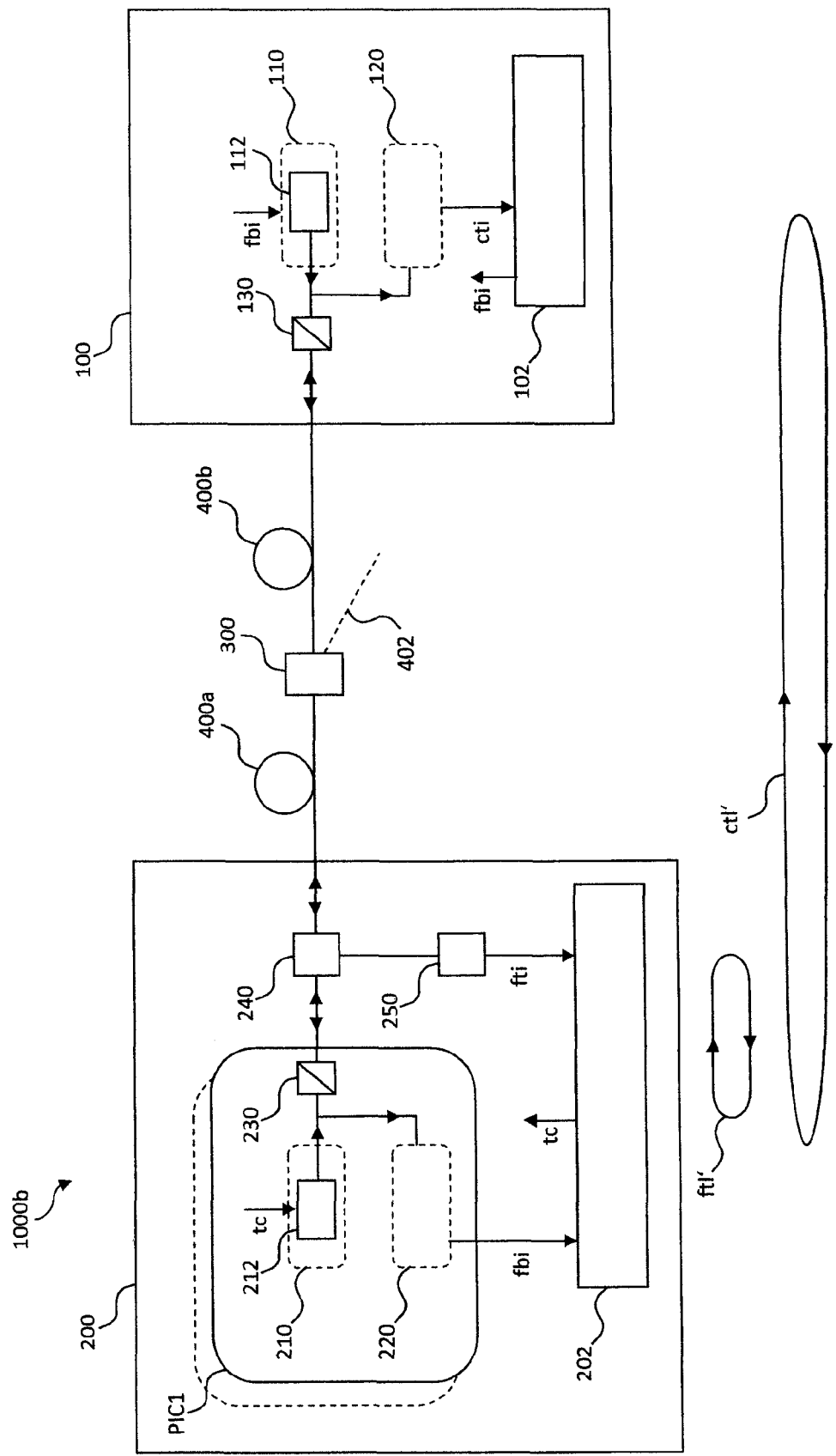

FIG. 6 depicts a schematic block diagram of an inventive optical transmission system 1000b according to a further embodiment, wherein a coarse tuning loop ctl' extends through the OLT 200 and the ONU 100, and wherein a fine tuning loop ftl' is integrated in the OLT 200.

The optical network elements 100, 200 depicted by FIG. 6 basically correspond to the devices 100, 200 already explained above with reference to FIG. 5. Insofar, the basic components 102, 110, 112, 120, 130 of the ONU 100 of FIG. 6 correspond to the configuration of FIG. 5. Further, the basic components 202, 210, 212, 220, 230, 240, 250 of the OLT 200 of FIG. 6 correspond to the configuration of the OLT 200 of FIG. 5.

The components 400a, 400b, 300, 402 of the optical transmission link according to FIG. 6 are identical to the corresponding components of FIG. 5.

However, in contrast to the FIG. 5 embodiment, the WDM PON 1000b according to FIG. 6 is configured to perform a process of wavelength tuning of the laser device 212 of the OLT 200. For this purpose, the ONU 100 is employed by the OLT 200 to form a coarse tuning loop ctl', which is similar to the coarse tuning loop ctl', apart from the direction of the respective information flows required for the coarse tuning. In contrast to FIG. 5, the fine tuning loop ftl' is completely integrated into to the OLT 200 so that no support by an external device, e.g. the ONU 100, is required for performing wavelength fine tuning of the laser device 212 of the OLT 200.

The coarse tuning process for the OLT 200 according to FIG. 6 is performed as follows: First, the OLT 200 transmits an optical signal at a transmission wavelength to be tuned via the link 400a, 300, 400b to the ONU 100. Insofar, this step of the coarse tuning procedure is similar to the step 2110 of FIG. 3.

Upon receiving the optical signal from the OLT 200, the ONU derives coarse tuning information cti, cf. the signal link between the receive path 120 and the control unit 102 of the ONU 100. The step of deriving coarse tuning information cti as such has already been explained with reference to FIG. 5 as is thus not repeated in detail for the present embodiment according to FIG. 6. However, generally, the coarse tuning information cti forwarded from the receive path 120 to the control unit 102 of the ONU 100 may e.g. depend on a detected wavelength error, or amplitude difference characterizing said wavelength error, of the transmission wavelength used by the OLT 200 for transmitting the optical signal to the ONU 100.

On the basis of the coarse tuning information cti, the control unit 102 of the ONU 100 determines and forwards to the OLT 200 suitable feedback information fbi which may serve the OLT 200 to alter the transmission wavelength of its laser device 212 in the course of coarse wavelength tuning. Forwarding the feedback information fbi from the ONU 100 to the OLT 200 may comprise transmitting it via a, preferably dedicated, control channel, that as such may be embedded in form of an AM sideband channel of the WDM channel pattern. Upon receiving the feedback information fbi, the OLT 200 evaluates it and tunes the transmission wavelength of its laser device 212 by means of the tuning control signal path tc. Thus, the coarse wavelength tuning loop ctl' is constituted, starting from OLT 200, via ONU 100 and back to the OLT 200. I.e., the coarse wavelength tuning loop ctl' of the WDM PON 1000b of FIG. 6 actually comprises both devices 100, 200, but, in contrast to the coarse wavelength tuning loop ctl of FIG. 5, starts at the OLT 200 of FIG. 6, because the OLT's laser device 212 is to be tuned.

The fine tuning loop ftl' of the WDM PON 1000b of FIG. 6 is completely integrated into the OLT 200. E.g., the OLT 200 generates an FM dither signal by means of its laser device 212, cf. step 2210' of FIG. 4b. By means of the coupler 240, a portion of this FM dither signal is coupled to the etalon 250, which provides at its output fine tuning information fti as already explained above. From analyzing, cf. step 2220' of FIG. 4b, this fine tuning information fti, the OLT 200, or its control unit 202, may locally (i.e., within the OLT 200) generate feedback information (not shown), which can be used to apply further wavelength tuning steps to the local laser device 212 by means of the signal tc.

Generally, the OLT 200 of FIG. 6 may not only be employed to provide a local fine tuning loop ftl', but the components 240, 250, 202 of the OLT 200 rather enable providing a fine tuning loop fti as explained above with reference to FIG. 5. I.e., the embodiments according to FIGS. 5 and 6 may advantageously be combined.

It is also possible to provide both the ONU 100 and the OLT 200 with any functionality mentioned for the respective devices in the context of both embodiments (FIG. 5, FIG. 6) so that different tuning loops ctl, ctl', fti, fti' may be provided and utilized.

In this context, it is to be pointed out, that within WDM PONS 1000a, 1000b, due to its central functionality, the OLT 200 generally offers potential for sharing functionality required for implementing the inventive principle. E.g., when configuring the OLT 200 to provide at least one or both of the fine tuning loops fti (FIG. 5), fti' (FIG. 6), the respective frequency discriminating element 250 and the associated resources of the control unit 202 may be shared among a plurality of ONUs 100 for fine tuning their respective laser devices 112.

Figure 7:
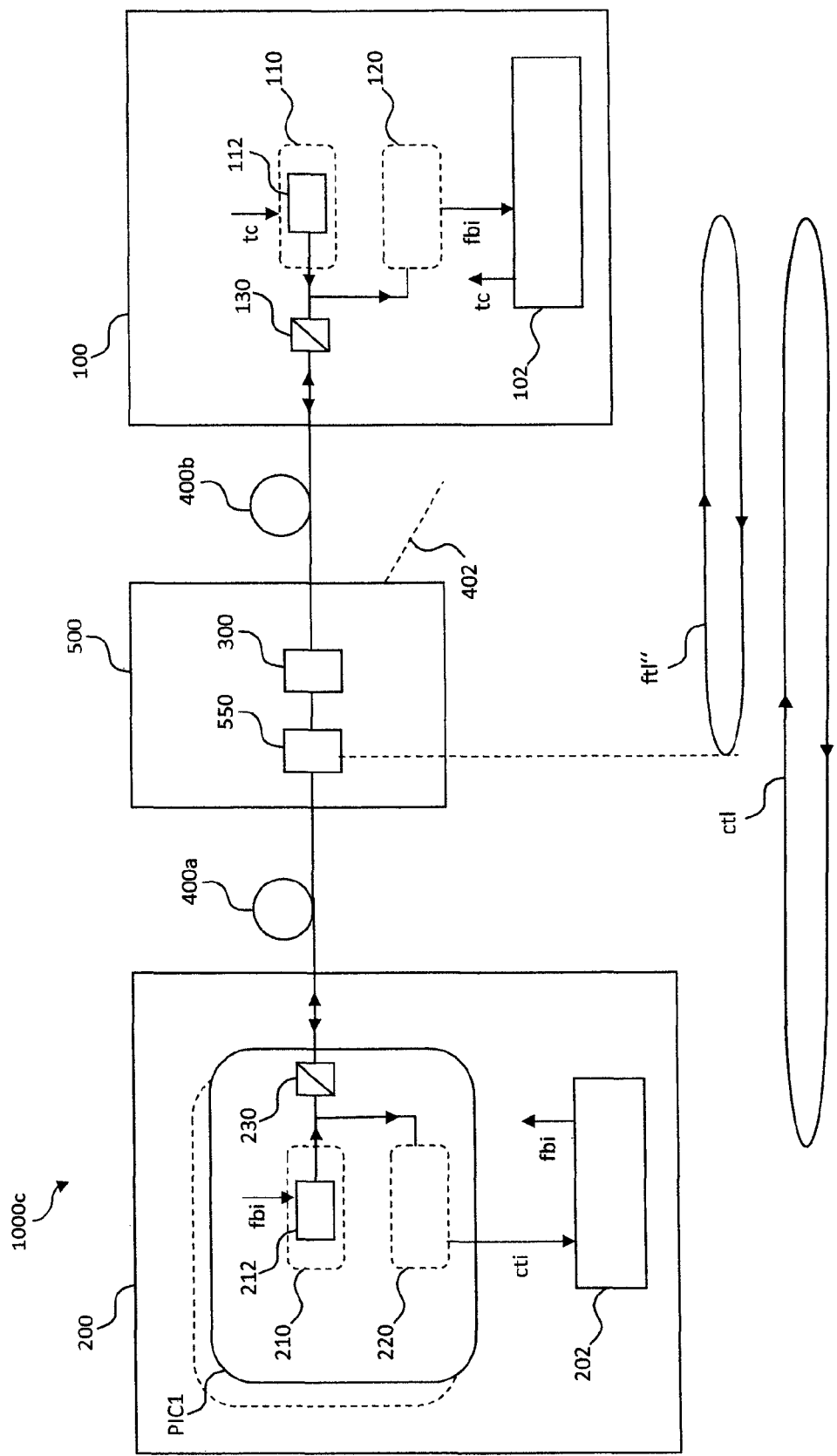

FIG. 7 depicts a schematic block diagram of an inventive optical transmission system 1000c, e.g. a WDM PON, according to a further embodiment, wherein a coarse tuning loop ctl extends through the ONU 100 and the OLT 200, and wherein a fine tuning loop ftl" extends through the ONU 100 and a further optical network element 500, which is presently designed as remote node (RN).

As can be seen from FIG. 7, the RN 500 is arranged between the fiber spans 400a, 400b and as such may be used to connect more than a single ONU 100 to the OLT 200, e.g. defining a tree topology for the WDM PON 1000c, also cf. the further optical link 402.

The RN comprises a WDM filter 300 and a frequency discriminator 550, e.g. a Fabry-Perot etalon, which can be supplied with optical signals traveling through the fiber spans 400a, 400b.

Regarding its capability to support, i.e. close, a coarse wavelength tuning loop (processing of coarse tuning information cti and returning of associated feedback information to the ONU 100), the OLT 200 of FIG. 7 is basically identical to the OLT 200 of FIG. 5 and as such enables to defined the coarse tuning loop ctl.

In contrast to the embodiment of FIG. 5, however, the fine tuning loop ftl" involves the components ONU 100 and RN 500, so that the configuration of FIG. 7 enables a so-called RN-based fine tuning of the transmission wavelength of the laser device 112 of the ONU 100. Thus, the OLT 200 according to FIG. 7 is not required to comprise components or functionality to support a fine tuning loop at all. Nevertheless, the embodiment according to FIG. 7, too, can be combined with the embodiments according to FIG. 5 and/or FIG. 6, so that fine tuning loop support may also be integrated within the OLT 200 of FIG. 7.

Presently, however, the OLT 200 of FIG. 7 does not offer fine tuning loop support. This is rather achieved by the RN 500, or by the etalon 550 integrated within said RN 500, respectively. The etalon 550 is configured to reflect a receive FM dither signal, that has been transmitted from the ONU 100 to the RN 500, back to the ONU 100 for analysis by the ONU 100. Thus, in the present embodiment according to FIG. 7, the ONU 100, or its control unit 102, is configured to process, i.e. analyze and/or evaluate the FM dither signal portion that has been reflected by the etalon 550 of the RN. This is symbolized by the feedback information fbi forwarded from the optical receive path 120 of the ONU 100 to the control unit 102. I.e., at least a portion of said feedback information fbi forwarded from the optical receive path 120 to the control unit 102 reflects the wavelength error information as obtained from the signal reflected by the etalon 550 within the RN 500, whereas a further portion of said feedback information fbi may reflect the coarse-tuning-related feedback information provided by the OLT 200 to the ONU 100. Depending on the feedback information fbi, the ONU 100 may tune its laser device 112 correspondingly.

Since a plurality of ONUS 100 may be connected to and supported by the RN 500, they may also share the RN's fine tuning capabilities for establishing respective fine tuning loops.

Figure 9:
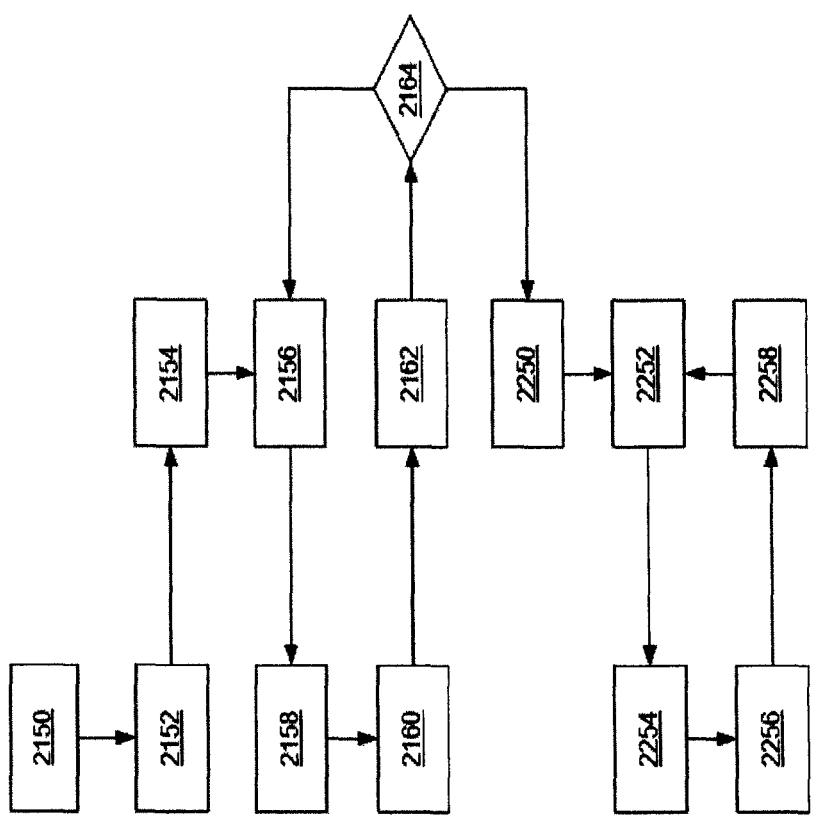

FIG. 9 depicts a simplified flow-chart of a further embodiment of the inventive method. In a first step 2150, which is e.g. performed by an OLT 200 (FIG. 1) of a WDM PON 1000, the OLT 200 assigns a dither frequency to the ONU 200 that is connected to the OLT 200. In step 2152, the OLT 200 transmits said assigned dither frequency to the ONU 200 via a control channel, which is e.g. an AM sideband channel that can be implemented in the WDM channels scheme of the WDM PON 1000 in a per se known manner.

In step 2154, the ONU 100 receives the dither frequency and starts sweeping, i.e. altering according to a predetermined scheme, the transmission wavelength of its laser device 112. The sweeping process may e.g. comprise linearly increasing the transmission wavelength of the laser device 112. In the course of sweeping the transmission wavelength, in step 2156, a new specific value for the transmission wavelength is set, and an optical signal at said specific value for the transmission wavelength is transmitted to the OLT 200. The OLT 200 measures an optical receive power in step 2158 and determines coarse tuning information, which is forwarded to the ONU 100 via the dedicated control channel in step 2160. In step 2162, the ONU 100 receives the coarse tuning information, and in step 2164, the ONU 100 determines, whether the coarse tuning information indicates that the currently set transmission wavelength of the laser device 112 is sufficiently precise, i.e. within a predetermined range such as a specific WDM channel.

If not, the process branches from step 2164 to step 2156, and one or more iterations of the procedure 2158, 2160, 2162, 2164 are performed.

If in step 2164 the ONU 100 deems the currently set transmission wavelength of the laser device 112 to be sufficiently precise, i.e. within a predetermined range such as the specific WDM channel, a coarse tuning procedure is finished and it proceeds to step 2250 which denotes the start of a fine tuning procedure.

In step 2252, an FM dither signal at the previously received (step 2154) dither frequency, e.g. 100 kHz, is transmitted by using the currently set transmission wavelength as has been obtained by the preceding coarse tuning procedure.

In step 2254, the OLT 200 receives said FM dither signal from the ONU 100 and analyzes the assigned FM dither frequency. Depending the results of the analysis 2254, the OLT 200 provides feedback in the form of fine tuning information to the ONU 100, which again is accomplished via the dedicated control channel. Upon receiving the fine tuning information, the ONU 100 may further tune its transmission wavelength or may decide to terminate the fine tuning process since the desired transmission wavelength of its laser device 112 has been attained by the fine tuning process.

The aforementioned embodiments may advantageously combined with each other. Furthermore, the inventive principle is not limited to WDM or WDM PON applications, but may rather also be used to perform wavelength tuning within single channel systems that only employ a single specific wavelength for data transmission between two optical network elements, e.g. within an optical P2P system.

The present invention advantageously enables a precise and efficient two-stage wavelength tuning of a tunable laser device 112, 212 of an optical network element 100, 200. Particularly, nested control loops in the sense of a closed-loop control may be established for tuning processes offering different or similar degrees of precision.

Preferably, said coarse tuning process 2100 (FIG. 2) comprises altering said at least one transmission wavelength by about 0.1 nm to about 40.0 nm, which is e.g. sufficient to shift a transmission wavelength to a desired WDM channel. Further preferably, said fine tuning process 2200 comprises altering said at least one transmission wavelength by about 0.001 nm to about 0.1 nm, which advantageously enables to use comparatively low-cost laser devices 112, 212 while at the same time keeping a transmission wavelength in the center of an associated WDM (i.e., CWDM, DWDM, UDWDM) channel.

The invention claimed is:

1. Optical network unit, ONU, wherein said optical network unit is configured to perform the following:
   a coarse tuning process of at least one transmission wavelength which is used by said first optical network element for transmitting an optical signal to an optical line terminal (OLT); and
   a fine tuning process of said at least one transmission wavelength performed after said coarse tuning process, comprising generating and transmitting a frequency modulated (FM) dither signal wherein the ONU is configured to transmit the FM dither signal simultaneously to an eventually ongoing user data transmission from the ONU to the OLT;
   wherein said optical network unit is configured to transmit an optical signal to said optical line terminal by using a first transmission wavelength, and to receive feedback information from said optical line terminal, wherein said feedback information comprises at least one of information indicating at least one parameter for a step of coarse tuning to be performed within said optical network unit, information indicative of the fact that no coarse tuning is necessary, to transmit an optical signal including the dither signal from said first optical network unit to said optical line terminal or a further optical network element by using said first transmission wavelength, and to receive feedback information from said optical line terminal or said further optical network element, wherein said feedback is at least partially generated from analyzing the dither signal providing information comprises at least one of information indicating at least one parameter for a step of fine tuning to be performed within said first optical network element, the information indicative of the fact that no fine tuning is necessary.

2. Optical network unit according to claim 1, wherein said optical network unit is configured to receive said feedback information from said optical line terminal and/or said further optical network element via a preferably dedicated control channel, wherein said control channel is preferably implemented in the form of a sideband transmission channel, and wherein said optical network unit is configured to tune said first transmission wavelength depending on feedback information received from said optical line terminal and/or said further optical network element.

* * * * *